(12) United States Patent
Li et al.

(10) Patent No.: US 12,533,640 B2
(45) Date of Patent: Jan. 27, 2026

(54) POLYTETRAFLUOROETHYLENE COMPOSITE FILTER MATERIAL AND PREPARATION METHOD AND USES THEREOF

(71) Applicant: ZHONGHAO CHENGUANG RESEARCH INSTITUTE OF CHEMICAL INDUSTRY CO., LTD., Sichuan (CN)

(72) Inventors: Jia Li, Sichuan (CN); Zhongliang Xiao, Sichuan (CN); Ping Xiao, Sichuan (CN); Hui Li, Sichuan (CN); Fan Yang, Sichuan (CN); Chunyang Cai, Sichuan (CN)

(73) Assignee: ZHONGHAO CHENGUANG RESEARCH NSTITUTE OF CHEMICAL INDUSTRY CO., LTD. (CN)

( * ) Notice: Subject to any disclaimer, the term of this patent is extended or adjusted under 35 U.S.C. 154(b) by 432 days.

(21) Appl. No.: 17/640,768

(22) PCT Filed: Aug. 24, 2020

(86) PCT No.: PCT/CN2020/110704
§ 371 (c)(1),
(2) Date: Mar. 4, 2022

(87) PCT Pub. No.: WO2021/189761
PCT Pub. Date: Sep. 30, 2021

(65) Prior Publication Data
US 2023/0047022 A1 Feb. 16, 2023

(30) Foreign Application Priority Data
Mar. 24, 2020 (CN) .......................... 202010214178.1

(51) Int. Cl.
*B01D 71/36* (2006.01)
*B01D 46/54* (2006.01)
*B01D 67/00* (2006.01)

(52) U.S. Cl.
CPC .......... *B01D 71/36* (2013.01); *B01D 46/543* (2013.01); *B01D 67/0006* (2013.01)

(58) Field of Classification Search
None
See application file for complete search history.

(56) References Cited

U.S. PATENT DOCUMENTS

| 4,532,316 A * | 7/1985 | Henn .................. B32B 7/12 |
| | | 528/80 |
| 2012/0246798 A1 * | 10/2012 | Williams ............. A41D 31/102 |
| | | 2/167 |

FOREIGN PATENT DOCUMENTS

| CN | 102068924 A | | 5/2011 | |
| CN | 102068924 B | * | 12/2013 | |
| CN | 104001387 A | | 8/2014 | |
| CN | 104582949 A | | 4/2015 | |
| CN | 104998469 A | | 10/2015 | |
| CN | 105814711 A | | 7/2016 | |
| CN | 105854414 A | * | 8/2016 | |
| CN | 108057279 A | | 5/2018 | |
| KR | 20200018755 A | * | 2/2020 | ............... B32B 7/12 |
| WO | 0056162 A1 | | 9/2000 | |
| WO | 2020037581 A1 | | 2/2020 | |

OTHER PUBLICATIONS

Muñoz-Milán, A.B., et al. (2005), Effect of the Amount of Calcium Carbonate as Filler on the Rheological and Adhesion Properties of a Water-Based Polyurethane Dispersion. Macromol. Symp., 221: 33-42. (Year: 2005).*
Zeng Xinrong, Li Deying, GB 8808-88 Test method for peel force of flexible laminated plastics, Standards Press of China, and National public service platform for standards information (website: http://std.samr.gov.cn/), Jul. 1, 1988, 3 pages.
Liu Shansheng, Li Jietao, GBT 1038-2000 Plastics-Film and sheeting—Determination of gas transmission, Standards Press of China, and National public service platform for standards information (website: http://std.samr.gov.cn/), Sep. 1, 2000, 4 pages.
Chen Jun, Ding Songtao, Yang Xiaobing, Tao Hong, Zhou Xiaoping, Cai Xailin, Zhang Shouxin, Yu Jingjing, GB 2626-2019 Respiratory protection Non-powered air-purifying particle respirator, Standards Press of China, and National public service platform for standards information (website: http://std.samr.gov.cn/), Jul. 1, 2020, 41 pages.

* cited by examiner

*Primary Examiner* — Magali P Slawski
*Assistant Examiner* — Eric J Mccullough
(74) *Attorney, Agent, or Firm* — Morriss O'Bryant Compagni Cannon, PLLC

(57) ABSTRACT

A polytetrafluoroethylene composite filter material, and a preparation method and uses thereof, comprises a support layer and a polytetrafluoroethylene microporous membrane layer, and the support layer and the polytetrafluoroethylene microporous membrane layer are compounded by an adhesive, wherein the adhesive comprises a two-component polyurethane adhesive, a pore forming agent and an inorganic filler. By adding a two-component solvent-free polyurethane adhesive with a low-temperature pore forming agent and an inorganic filler, the pore forming agent forms an irregular pore channel structure at the bonding interface during curing, and the inorganic filler prevents the adhesive from entering the micropores of the polytetrafluoroethylene membrane, so that the air permeability and filtration efficiency of the polytetrafluoroethylene microporous membrane are not affected after compounding. The polytetrafluoroethylene composite filter material has good air permeability, high peel strength, good filtration efficiency and good barrier effect.

9 Claims, No Drawings

POLYTETRAFLUOROETHYLENE COMPOSITE FILTER MATERIAL AND PREPARATION METHOD AND USES THEREOF

CROSS REFERENCE

The present application is a national phase entry under 35 U.S.C. § 371 of PCT/CN2020/110704 filed on Aug. 24, 2020, which claims priority to Chinese Patent Application No. 202010214178.1, entitled "Polytetrafluoroethylene composite filter material and preparation method and uses thereof", and filed on Mar. 24, 2020, the entire disclosures of which are incorporated herein by reference in its their entirety.

TECHNICAL FIELD

The present invention relates to the field of air filtration, specifically, to a polytetrafluoroethylene (PTFE) composite filter material and preparation method and uses thereof.

BACKGROUND ART

With the enhancement of people's health awareness, the requirements for air quality are also increased accordingly. Dust in the air is one of the main pollutants. The dust usually carries bacteria. The filtering efficiency of traditional mask filter materials for particles with a diameter less than 1 μm is not ideal, and it has limited protection against airborne diseases such as "influenza" and "COVID-19".

Polytetrafluoroethylene microporous membrane is a microporous membrane made from polytetrafluoroethylene resin as raw material by mixing, blanking, calendering to form a membrane, biaxial stretching, curing and sintering and the like. The polytetrafluoroethylene microporous membrane has an average pore diameter of 0.1 to 50 μm, which has the characteristics such as small pore size, uniform pore diameter distribution, smooth surface, and it has a good filtering effect for particles with diameter less than 1 μm and even PM2.5 when it is used in the field of air filtration. Due to the thin thickness of polytetrafluoroethylene microporous membrane and poor mechanical strength such as tensile strength, it is often necessary to compound with supporting materials in practical application. Polytetrafluoroethylene microporous membrane has low surface energy and poor wetting ability, it is difficult to make it compound with the substrate, and it is undoubtedly more difficult to make the composite strength high without affecting the gas flow and filtering effect of the polytetrafluoroethylene microporous membrane.

Material compound technology includes interfacial polymerization, monomer catalytic polymerization, solution casting, solution dip coating or spray coating, plasma polymerization, water surface spreading method and the like. Currently, polytetrafluoroethylene microporous films are commonly compounded by hot melt bonding and coating sintering. In patent application No. CN104998469A, surface static electricity is removed by preheating treatment of the polytetrafluoroethylene microporous membrane, and polyester non-woven fabric is subjected to flame burning pretreatment, and then the polytetrafluoroethylene microporous membrane and polyester non-woven fabric are laminated together by hot pressing, but the peel strength of the resulting composite material is low. Patent application No. CN108057279A discloses a polytetrafluoroethylene film-coated filter material and a preparation method thereof, by coating fluoropolymer on the surface of needled felt, the surface of upper fiber of the needled felt is wrapped with a layer of low surface energy adhesive, and the PTFE microporous membrane is further preheated by covering the hot roll, and then enters the roll gap of the rolling mill to be hot rolled together with the fiber needled felt. Before compounding, PTFE microporous membrane is fully heated, thereby, the adhesion fastness between the PTFE microporous membrane and the needled felt is improved. However, a relatively dense layer is usually formed at the interface between two membranes, which has a great influence on the gas flux of the composite material, which will reduce the flux and the filtration efficiency.

SUMMARY OF THE INVENTION

Aiming at the defects of the prior art, the present invention provides a polytetrafluoroethylene composite filter material and a preparation method and uses thereof.

Specifically, in order to achieve the above object, the present invention adopts the following technical solutions:

A polytetrafluoroethylene composite filter material, comprising a support layer and a polytetrafluoroethylene microporous membrane layer, wherein the support layer and the polytetrafluoroethylene microporous membrane layer are compounded by an adhesive, wherein the adhesive comprises a two-component polyurethane adhesive, a pore forming agent and an inorganic filler.

Preferably, in the above polytetrafluoroethylene composite filter material, the support layer is one or more selected from polypropylene non-woven fabric, polyester non-woven fabric, polyethylene non-woven fabric and polyamide non-woven fabric.

Preferably, in the above polytetrafluoroethylene composite filter material, the support layer has a thickness of 30 to 50 μm, and an average pore diameter of 3 to 8 μm.

Preferably, in the above polytetrafluoroethylene composite filter material, the polytetrafluoroethylene microporous membrane layer has a thickness of 10 to 80 μm, an average pore diameter of 0.2 to 0.8 μm, and a porosity of 85% to 89%.

Preferably, in the above polytetrafluoroethylene composite filter material, the mass fraction of the pore forming agent in the adhesive is 2% to 5%; and/or the mass fraction of the inorganic filler in the adhesive is 3% to 8%.

Preferably, in the above polytetrafluoroethylene composite filter material, the two-component polyurethane adhesive is prepared by reacting raw materials including polyester polyol and isocyanate polyester polyol; More preferably, the mass ratio of the polyester polyol to the isocyanate polyester polyol is (0.8 to 1.4):1; More preferably, the polyester polyol is prepared from raw materials including 20 to 30 parts by weight of adipic acid, 25 to 35 parts by weight of sebacic acid, 5 to 20 parts by weight of 1,2-propanediol, 15 to 30 parts by weight of butanediol and 25 to 40 parts by weight of diethylene glycol by esterification reaction at 140 to 160° C. for 2 to 4 h and polycondensation reaction at 200 to 220° C. for 1 to 3 h, and/or, the isocyanate polyester polyol is prepared by reacting raw materials including 10 to 15 parts by weight of polybutylene adipate, 20 to 35 parts by weight of polypropylene glycol and 15 to 25 parts by weight of phenylenedimethylene diisocyanate at 70 to 90° C. for 3 to 5 h.

Preferably, in the above polytetrafluoroethylene composite filter material, the two-component polyurethane adhesive is prepared by reacting the polyester polyol and isocyanate polyester polyol under stirring at 25 to 30° C. for 2 to 4 h.

Preferably, in the above polytetrafluoroethylene composite filter material, the pore forming agent is one or more selected from polyethylene oxide, polystyrene microspheres and polymethylmethacrylate; and/or the inorganic filler is one or more selected from calcium carbonate, barium carbonate and magnesium carbonate.

The present invention also provides a method for preparing the above polytetrafluoroethylene composite filter material, which comprises the following steps:

Step 1: mixing a two-component polyurethane adhesive, a pore forming agent and an inorganic filler uniformly to obtain an adhesive;

Step 2: coating the adhesive obtained in step 1 uniformly on one side of the support layer with a coating amount of 1.5 to 2 g/m$^2$;

Step 3: laminating the adhesive coated surface of the support layer and the polytetrafluoroethylene microporous membrane and performing pressurizing and heating treatment to bond them together, wherein the pressurizing and heating treatment is performed at a pressure of 1.5 Mpa to 3.2 MPa, and a temperature of 50 to 60° C.;

Step 4: curing the composite material obtained in step 3 at a temperature of 55 to 70° C. for 6 to 12 h to obtain the polytetrafluoroethylene composite filter material.

The present invention also provides uses of the above polytetrafluoroethylene composite filter material or the above polytetrafluoroethylene composite filter material prepared by the preparation method in air purification equipment or masks.

The beneficial effects of the present invention are mainly as follows:

1. the present invention adopts a two-component solvent-free polyurethane adhesive, and by adding a low-temperature pore forming agent and an inorganic filler, the pore forming agent forms an irregular pore channel structure at the bonding interface during curing, and the inorganic filler prevents the adhesive from entering the micropores of the polytetrafluoroethylene membrane, so that the air permeability and filtration efficiency of the polytetrafluoroethylene microporous membrane are not affected after compounding; and the prepared polytetrafluoroethylene composite filter material has good air permeability, high peel strength, good filtration efficiency and good barrier effect;

2. The compounding process adopted by the present invention is simple in operation and suitable for large-scale production.

Specific Modes for Carrying Out the Embodiments

Hereinafter, the present invention will be further described in detail with reference to specific Examples, but it is not intended to limit the scope of the present invention.

If the specific test steps or conditions are not indicated in the Examples, it shall be carried out in accordance with the operations or conditions of the conventional test steps described in the literature in the art. The reagents and instruments without the manufacturer's indication can be obtained through the market purchase.

The sources of raw materials and reagents used in the Examples of the present invention are shown in Table 1.

TABLE 1

| Name | Manufacturer |
|---|---|
| Adipic acid | Sinopharm Chemical Reagent Co., Ltd |
| Sebacic acid | Chengdu Kelong Chemical Reagent Factory |
| 1,2-propanediol | Shanghai Aladdin Biochemical Technology Co., Ltd |
| Butanediol | Chengdu Kelong Chemical Reagent Factory |
| Diglycol | Tianjin Fuchen Chemical Reagent Factory |
| Polyglycol adipate | Yantai Huada Chemical Co., Ltd |
| Polypropylene glycol | Fujian Lexiang Chemical Co., Ltd |
| Benzene methylene diisocyanate | Bayer Corp. |
| Polystyrene | Suzhou Nanomicro Technology Co., Ltd. |
| Polyoxyethylene | Sigma-Aldrich Corp. |
| Barium carbonate | Shanghai Aladdin Biochemical Technology Co., Ltd |
| Calcium carbonate | Shanghai Aladdin Biochemical Technology Co., Ltd |
| TPU hot melt adhesive | Minnesota Mining and Manufacturing Corporation |
| Polypropylene non-woven fabric | Exxon Mobil Corporation |
| Polyester non-woven fabric | Dezhou Zhengyu Geotechnical Material Co., Ltd |
| Polyethylene non-woven fabric | Dupont Company |
| Polyamide non-woven fabric | Zhejiang Huahao New Material Co., Ltd |
| Polytetrafluoroethylene microporous membrane | Zhonghao Chenguang Research Institute of Chemical Industry Co., Ltd., CGPMH series. |

EXAMPLE 1

Example 1 provides a polytetrafluoroethylene composite filter material, which comprises a support layer and a polytetrafluoroethylene layer, the support layer is made of polypropylene non-woven fabric, and has a thickness of 36 μm and an average pore diameter of 4.3 μm; and the polytetrafluoroethylene microporous membrane layer has a thickness of 25 μm, an average pore diameter of 0.31 μm and a porosity of 86%. The support layer and the polytetrafluoroethylene layer are compounded by an adhesive, and the adhesive comprises a two-component polyurethane adhesive, polystyrene and barium carbonate in a mass ratio of 92.2:3.6:4.2.

The method for preparing the polytetrafluoroethylene composite filter material described in the present Example specifically comprises the following steps:

(1) 20 parts by weight of adipic acid, 25 parts by weight of sebacic acid, 5 parts by weight of 1,2-propanediol, 15 parts by weight of butanediol and 25 parts by weight of diethylene glycol were esterified at 140° C. for 2 h, and then subjected to polycondensation at 200° C. for 1 h to obtain polyester polyol A; 13 parts by weight of polybutylene adipate, 25 parts by weight of polypropylene glycol and 18 parts by weight of phenylenedimethylene diisocyanate were reacted at 75° C. for 3.5 h to obtain isocyanate polyester polyol B;

(2) the polyester polyol A and isocyanate polyester polyol B with a mass ratio of 1:1 were reacted under stirring at 25° C. for 3 h to obtain the two-component polyurethane adhesive;

(3) the two-component polyurethane adhesive, polystyrene and barium carbonate were mixed uniformly to obtain an adhesive;

(4) the adhesive was coated uniformly on one side of the support layer with a coating amount of 1.6 g/m$^2$;

(5) the adhesive coated surface of the support layer and the polytetrafluoroethylene microporous membrane were laminated and subjected to pressurizing and heating treatment under a pressure of 2.1 Mpa and a temperature of 55° C. to bond them together;

(6) the composite material obtained in step (5) was cured at 58° C. for 10 h to obtain the polytetrafluoroethylene composite filter material of the present Example.

EXAMPLE 2

Example 2 provides a polytetrafluoroethylene composite filter material, which comprises a support layer and a polytetrafluoroethylene layer, wherein the support layer is made of polyethylene non-woven fabric and has a thickness of 38 μm and an average pore diameter of 4.9 μm, and the polytetrafluoroethylene microporous membrane layer has a thickness of 25 μm, an average pore diameter of 0.31 μm and a porosity of 86%. The support layer and the polytetrafluoroethylene layer are compounded by an adhesive, and the adhesive comprises a two-component polyurethane adhesive, polyethylene oxide and calcium carbonate in a mass ratio of 94.4:2.4:3.2.

The method for preparing the polytetrafluoroethylene composite filter material described in the present Example specifically comprises the following steps:

(1) 24 parts by weight of adipic acid, 28 parts by weight of sebacic acid, 10 parts by weight of 1,2-propanediol, 15 parts by weight of butanediol and 32 parts by weight of diethylene glycol were esterified at 150° C. for 3 h, and then subjected to polycondensation at 200° C. for 2 h to obtain polyester polyol A; 12 parts by weight of polybutylene adipate, 30 parts by weight of polypropylene glycol and 20 parts by weight of phenylenedimethylene diisocyanate were reacted at 80° C. for 4 h to obtain isocyanate polyester polyol B;

(2) the polyester polyol A and isocyanate polyester polyol B with a mass ratio of 0.9:1 were reacted under stirring at 25° C. for 3 h to obtain the two-component polyurethane adhesive;

(3) the two-component polyurethane adhesive, polystyrene and barium carbonate were mixed uniformly to obtain the adhesive;

(4) the adhesive was coated uniformly on one side of the support layer with a coating amount of 1.6 g/m$^2$;

(5) the adhesive coated surface of the support layer and the polytetrafluoroethylene microporous membrane were laminated, and subjected to pressurizing and heating treatment under a pressure of 1.7 Mpa and a temperature of 58° C. to bond them together;

(6) the composite material obtained in step (5) was cured at 62° C. for 8 h to obtain the polytetrafluoroethylene composite filter material of the present Example.

EXAMPLE 3

Example 3 provides a polytetrafluoroethylene composite filter material, which comprises a support layer and a polytetrafluoroethylene layer, wherein the support layer is made of polyamide non-woven fabric and has a thickness of 45 μm and an average pore diameter of 5.1 μm, and the polytetrafluoroethylene microporous membrane layer has a thickness of 25 μm, an average pore diameter of 0.31 μm and a porosity of 86%. The support layer and the polytetrafluoroethylene layer are compounded by an adhesive, and the adhesive comprises a two-component polyurethane adhesive, polystyrene and barium carbonate in a mass ratio of 92.2:3.6:4.2.

The method for preparing the polytetrafluoroethylene composite filter material in the present Example specifically comprises the following steps:

(1) 28 parts by weight of adipic acid, 30 parts by weight of sebacic acid, 8 parts by weight of 1,2-propanediol, 25 parts by weight of butanediol and 34 parts by weight of diethylene glycol were esterified at 160° C. for 4 h, and then subjected to polycondensation at 220° C. for 3 h to obtain polyester polyol A; 15 parts by weight of polybutylene adipate, 30 parts by weight of polypropylene glycol and 22 parts by weight of phenylenedimethylene diisocyanate were reacted at 80° C. for 4 h to obtain isocyanate polyester polyol B;

(2) the polyester polyol A and isocyanate polyester polyol B with a mass ratio of 0.9:1 were reacted under stirring at 25° C. for 3 h to obtain the two-component polyurethane adhesive;

(3) the two-component polyurethane adhesive, polystyrene and barium carbonate were mixed uniformly to obtain the adhesive;

(4) the adhesive was coated uniformly on one side of the support layer with a coating amount of 1.6 g/m$^2$;

(5) the adhesive coated surface of the support layer and the polytetrafluoroethylene microporous membrane were laminated, and subjected to pressurizing and heating treatment under a pressure of 1.7 Mpa and a temperature of 58° C. to bond them together;

(6) the composite material obtained in step (5) was cured at 62° C. for 8 h to obtain the polytetrafluoroethylene composite filter material of the present Example.

EXAMPLE 4

Example 4 provides a polytetrafluoroethylene composite filter material, which differs from Example 1 only in that: in the preparation method of polytetrafluoroethylene composite filter material described in Example 4, the step (1) was as follows: 10 parts by weight of adipic acid, 40 parts by weight of sebacic acid, 25 parts by weight of 1,2-propanediol, 10 parts by weight of butanediol and 25 parts by weight of diethylene glycol were esterified at 140° C. for 2 h, and then subjected to polycondensation at 200° C. for 1 h to obtain polyester polyol A; 5 parts by weight of polybutylene adipate, 35 parts by weight of polypropylene glycol and 10 parts by weight of phenylenedimethylene diisocyanate were reacted at 75° C. for 3.5 h to obtain isocyanate polyester polyol B.

COMPARATIVE EXAMPLE 1

Comparative Example 1 provides a polytetrafluoroethylene composite filter material, which differs from Example 1 only in that: the adhesive used in Comparative Example 1 is a conventional TPU adhesive.

COMPARATIVE EXAMPLE 2

Comparative Example 2 provides a polytetrafluoroethylene composite filter material, which comprises a support layer and a polytetrafluoroethylene layer, wherein the support layer is made of polypropylene non-woven fabric and has a thickness of 36 μm and an average pore diameter of 4.3 μm; and the polytetrafluoroethylene microporous membrane layer has a thickness of 25 μm, an average pore diameter of 0.31 μm and a porosity of 86%. The support layer and the polytetrafluoroethylene layer are compounded by an adhesive, and the adhesive is a two-component polyurethane adhesive.

The method for preparing the polytetrafluoroethylene composite filter material described in the present Comparative Example specifically comprises the follow steps:

(1) 20 parts by weight of adipic acid, 25 parts by weight of sebacic acid, 5 parts by weight of 1,2-propanediol, 15 parts by weight of butanediol and 25 parts by weight of diethylene glycol were esterified at 140° C. for 2 h, and then subjected to polycondensation at 200° C. for 1 h to obtain polyester polyol A; 13 parts by weight of polybutylene adipate, 25 parts by weight of polypropylene glycol and 18 parts by weight of phenylenedimethylene diisocyanate were reacted at 75° C. for 3.5 h to obtain isocyanate polyester polyol B;

(2) the polyester polyol A and isocyanate polyester polyol B with a mass ratio of 1:1 were reacted under stirring at 25° C. for 3 h to obtain the two-component polyurethane adhesive;

(3) the two-component polyurethane adhesive was coated uniformly on one side of the supporting layer with a coating amount of 1.6 g/m$^2$;

(4) the adhesive coated surface of the support layer and the polytetrafluoroethylene microporous membrane were laminated, and subjected to pressurizing and heating treatment under a pressure of 2.1 Mpa and a temperature of 55° C. to bond them together;

(5) the composite material obtained in step (4) was cured at 58° C. for 10 h to obtain the polytetrafluoroethylene composite filter material of the present Comparative Example.

COMPARATIVE EXAMPLE 3

Comparative Example 3 provides a polytetrafluoroethylene composite filter material, which comprises a support layer and a polytetrafluoroethylene layer, wherein the support layer is made of polypropylene non-woven fabric and has a thickness of 36 μm and an average pore diameter of 4.3 μm; and the polytetrafluoroethylene microporous membrane layer has a thickness of 25 μm, an average pore diameter of 0.31 μm and a porosity of 86%.

The support layer and the polytetrafluoroethylene layer are compounded by an adhesive, and the adhesive comprises a two-component polyurethane adhesive and polystyrene in a mass ratio of 92.2:3.6.

The method for preparing the polytetrafluoroethylene composite filter material in the present Comparative Example specifically comprises the follow steps:

(1) 20 parts by weight of adipic acid, 25 parts by weight of sebacic acid, 5 parts by weight of 1,2-propanediol, 15 parts by weight of butanediol and 25 parts by weight of diethylene glycol were esterified at 140° C. for 2 h, and then subjected to polycondensation at 200° C. for 1 h to obtain polyester polyol A; 13 parts by weight of polybutylene adipate, 25 parts by weight of polypropylene glycol and 18 parts by weight of phenylenedimethylene diisocyanate were reacted at 75° C. for 3.5 h to obtain isocyanate polyester polyol B;

(2) the polyester polyol A and isocyanate polyester polyol B with a mass ratio of 1:1 were reacted under stirring at 25° C. for 3 h to obtain the two-component polyurethane adhesive;

(3) the two-component polyurethane adhesive and polystyrene were mixed uniformly to obtain an adhesive;

(4) the adhesive was coated uniformly on one side of the support layer with a coating amount of 1.6 g/m$^2$;

(5) the adhesive coated surface of the support layer and the polytetrafluoroethylene microporous membrane were laminated, and subjected to pressurizing and heating treatment under a pressure of 2.1 Mpa and a temperature of 55° C. to bond them together;

(6) the composite material obtained in step (5) was cured at 58° C. for 10 h to obtain the polytetrafluoroethylene composite filter material of the present Comparative Example.

COMPARATIVE EXAMPLE 4

Comparative Example 4 provides a polytetrafluoroethylene composite filter material, which comprises a support layer and a polytetrafluoroethylene layer, wherein the support layer is made of polypropylene non-woven fabric and has a thickness of 36 μm and an average pore diameter of 4.3 μm; and the polytetrafluoroethylene microporous membrane layer has a thickness of 25 μm, an average pore diameter of 0.31 μm and a porosity of 86%. The support layer and the polytetrafluoroethylene layer are compounded by an adhesive, and the adhesive comprises a two-component polyurethane adhesive and barium carbonate in a mass ratio of 92.2:4.2.

The method for preparing the polytetrafluoroethylene composite filter material in the present Comparative Example specifically comprises the follow steps:

(1) 20 parts by weight of adipic acid, 25 parts by weight of sebacic acid, 5 parts by weight of 1,2-propanediol, 15 parts by weight of butanediol and 25 parts by weight of diethylene glycol were esterified at 140° C. for 2 h, and then subjected to polycondensation at 200° C. for 1 h to obtain polyester polyol A; 13 parts by weight of polybutylene adipate, 25 parts by weight of polypropylene glycol and 18 parts by weight of phenylenedimethylene diisocyanate were reacted at 75° C. for 3.5 h to obtain isocyanate polyester polyol B;

(2) the polyester polyol A and isocyanate polyester polyol B with a mass ratio of 1:1 were reacted under stirring at 25° C. for 3 h to obtain the two-component polyurethane adhesive;

(3) the two-component polyurethane adhesive and barium carbonate were mixed uniformly to obtain an adhesive;

(4) the adhesive was coated uniformly on one side of the support layer with a coating amount of 1.6 g/m$^2$;

(5) the adhesive coated surface of the support layer and the polytetrafluoroethylene microporous membrane were laminated, and subjected to pressurizing and heating treatment under a pressure of 2.1 Mpa and a temperature of 55° C. to bond them together;

(6) the composite material obtained in step (5) was cured at 58° C. for 10 h to obtain the polytetrafluoroethylene composite filter material of the present Comparative Example.

EXPERIMENTAL EXAMPLE

The performance of polytetrafluoroethylene composite filter materials provided in Examples 1 to 4 and Comparative Examples 1 to 4 were tested, and the test results were shown in Table 2, in which:

The air permeability was carried out according to GBT 1038-2000 "Plastics-Film and Sheeting-Determination of gas transmission";

The peel strength test was carried out according to GB 8808-88 "Test method for peel force of flexible laminated plastics";

The filtration efficiency test was carried out according to GB 2626-2019 "Respiratory protection Non-powered air purifying particle respirator".

TABLE 2

Test results for the performances of polytetrafluoroethylene microporous membrane composite filter material

| Item | Air permeability (%) | Filtration efficiency (%) | Peel strength (N) |
|---|---|---|---|
| Example 1 | 95 | 99.6 | 2.6 |
| Example 2 | 97 | 99.3 | 2.1 |
| Example 3 | 96 | 99.3 | 2.5 |
| Example 4 | 93 | 99.2 | 2.3 |
| Comparative Example 1 | 88 | 98.5 | 1.7 |
| Comparative Example 2 | 85 | 98.5 | 2.2 |
| Comparative Example 3 | 90 | 98.7 | 2.4 |
| Comparative Example 4 | 93 | 98.9 | 2.3 |

Although general description, specific embodiments and experiments have been used to describe the present invention in detail above, it is obvious to a person skilled in the art that some modifications or improvements can be made on the basis of the present invention. Therefore, all these modifications or improvements made without departing from the spirit of the present invention belong to the scope of the present invention.

INDUSTRIAL APPLICABILITY

The present invention provides a polytetrafluoroethylene composite filter material and a preparation method and uses thereof. The polytetrafluoroethylene composite filter material comprises a support layer and a polytetrafluoroethylene microporous membrane layer, and the support layer and the polytetrafluoroethylene microporous membrane layer are compounded by an adhesive, wherein the adhesive comprises a two-component polyurethane adhesive, a pore forming agent and an inorganic filler. The present invention adopts a two-component solvent-free polyurethane adhesive, and by adding a low-temperature pore forming agent and an inorganic filler, the pore forming agent forms an irregular pore channel structure at the bonding interface during curing, and the inorganic filler prevents the adhesive from entering the micropores of the polytetrafluoroethylene membrane, so that the air permeability and filtration efficiency of the polytetrafluoroethylene microporous membrane are not affected after compounding; and the prepared polytetrafluoroethylene composite filtration material has good air permeability, high peel strength, good filtration efficiency, good barrier effect, and good economic value and application prospect.

The invention claimed is:

1. A polytetrafluoroethylene composite filter material, comprising a support layer and a polytetrafluoroethylene microporous membrane layer, the support layer and the polytetrafluoroethylene microporous membrane layer are compounded by an adhesive, wherein the adhesive comprises a two-component polyurethane adhesive, a pore forming agent and an inorganic filler, wherein the pore forming agent is one or more selected from polyethylene oxide, polystyrene microspheres and polymethylmethacrylate; the mass fraction of the pore forming agent in the adhesive is 2% to 5%; and the inorganic filler is one or more selected from calcium carbonate, barium carbonate and magnesium carbonate; and the mass fraction of the inorganic filler in the adhesive is 3% to 8%, wherein the two-component polyurethane adhesive is prepared by reacting raw materials including polyester polyol and isocyanate polyester polyol;

the mass ratio of the polyester polyol to the isocyanate polyester polyol is (0.8 to 1.4):1;

the polyester polyol is prepared from raw materials including 20 to 30 parts by weight of adipic acid, 25 to 35 parts by weight of sebacic acid, 5 to 20 parts by weight of 1,2-propanediol, 15 to 30 parts by weight of butanediol and 25 to 40 parts by weight of diethylene glycol by esterification reaction at 140 to 160° C. for 2 to 4 h and polycondensation reaction at 200 to 220° C. for 1 to 3 h, and, the isocyanate polyester polyol is prepared by reacting raw materials including 10 to 15 parts by weight of polybutylene adipate, 20 to 35 parts by weight of polypropylene glycol and 15 to 25 parts by weight of phenylenedimethylene diisocyanate at 70 to 90° C. for 3 to 5 h.

2. The polytetrafluoroethylene composite filter material according to claim 1, wherein the support layer is one or more selected from polypropylene non-woven fabric, polyester non-woven fabric, polyethylene non-woven fabric and polyamide non-woven fabric.

3. The polytetrafluoroethylene composite filter material according to claim 1, wherein the support layer has a thickness of 30 to 50 μm, and an average pore diameter of 3 to 8 μm.

4. The polytetrafluoroethylene composite filter material according to claim 1, wherein the polytetrafluoroethylene microporous membrane layer has a thickness of 10 to 80 μm, an average pore diameter of 0.2 to 0.8 μm, and a porosity of 85% to 89%.

5. The polytetrafluoroethylene composite filter material according to claim 1, wherein the two-component polyurethane adhesive is prepared by reacting the polyester polyol and isocyanate polyester polyol under stirring at 25 to 30° C. for 2 to 4 h.

6. A method for preparing the polytetrafluoroethylene composite filter material according to claim 1, characterized by comprising the following steps:

step 1: mixing the two-component polyurethane adhesive, the pore forming agent and the inorganic filler uniformly to obtain the adhesive, step 2: coating the adhesive obtained in step 1 uniformly on one side of the support layer with a coating amount of 1.5 to 2 g/m$^2$;

step 3: laminating the adhesive coated surface of the support layer and the polytetrafluoroethylene microporous membrane and performing pressurizing and heating treatment to bond them together, wherein the pressurizing and heating treatment is performed at a pressure of 1.5 Mpa to 3.2 MPa, and a temperature of 50 to 60° C.;

step 4: curing the composite material obtained in step 3 at a temperature of 55 to 70° C. for 6 to 12 h to obtain the polytetrafluoroethylene composite filter material.

7. The polytetrafluoroethylene composite filter material according to claim 2, wherein the support layer has a thickness of 30 to 50 μm, and an average pore diameter of 3 to 8 μm.

8. The polytetrafluoroethylene composite filter material according to claim 2, wherein the polytetrafluoroethylene microporous membrane layer has a thickness of 10 to 80 μm, an average pore diameter of 0.2 to 0.8 μm, and a porosity of 85% to 89%.

9. The polytetrafluoroethylene composite filter material according to claim 3, wherein the polytetrafluoroethylene microporous membrane layer has a thickness of 10 to 80 μm, an average pore diameter of 0.2 to 0.8 μm, and a porosity of 85% to 89%.

* * * * *